(12) United States Patent
Tomkins

(10) Patent No.: US 9,457,616 B2
(45) Date of Patent: Oct. 4, 2016

(54) WIRE WHEEL ASSEMBLY

(76) Inventor: Charles William Tomkins, Peterborough (GB)

( * ) Notice: Subject to any disclaimer, the term of this patent is extended or adjusted under 35 U.S.C. 154(b) by 1042 days.

(21) Appl. No.: 13/459,954

(22) Filed: Apr. 30, 2012

(65) Prior Publication Data

US 2012/0280561 A1    Nov. 8, 2012

(51) Int. Cl.
    *B60B 1/02*    (2006.01)

(52) U.S. Cl.
    CPC .............. *B60B 1/02* (2013.01); *B60Y 2200/11* (2013.01)

(58) Field of Classification Search
    CPC ............. B60B 1/00; B60B 1/02; B60B 1/04; B60B 7/01
    USPC ......... 301/55–61, 66–75, 79–81, 95–98, 104
    See application file for complete search history.

(56) References Cited

U.S. PATENT DOCUMENTS

| | | | | |
|---|---|---|---|---|
| 1,802,773 A * | 4/1931 | Nelson | .......................... | 301/29.2 |
| 2,316,642 A * | 4/1943 | Woodward | ................... | 301/13.1 |
| 2,545,130 A * | 3/1951 | Ash | .............................. | 301/36.1 |
| 2,553,161 A * | 5/1951 | Ash | ................................ | 301/6.1 |
| 3,279,860 A * | 10/1966 | Wise | .......................... | 301/37.32 |
| 3,993,357 A * | 11/1976 | Reppert | .......................... | 301/58 |
| 4,150,854 A * | 4/1979 | Lohmeyer | ....................... | 301/58 |
| 5,215,137 A * | 6/1993 | Weeks et al. | ............... | 152/379.4 |
| 5,360,261 A * | 11/1994 | Archibald et al. | ........ | 301/63.107 |
| 6,425,641 B1 | 7/2002 | Herting | | |
| 6,598,640 B1 * | 7/2003 | Reynolds et al. | ............. | 152/539 |
| 7,083,238 B2 * | 8/2006 | Clements et al. | ............ | 301/11.1 |
| 8,011,734 B1 * | 9/2011 | Johnson | .......................... | 301/5.1 |
| 2011/0037309 A1 * | 2/2011 | Chiu | ........................... | 301/37.24 |

FOREIGN PATENT DOCUMENTS

GB    1474623    5/1977

* cited by examiner

*Primary Examiner* — S. Joseph Morano
*Assistant Examiner* — Jean Charleston
(74) *Attorney, Agent, or Firm* — Merek, Blackmon & Voorhees, LLC

(57) ABSTRACT

Wire wheel assembly apparatus for, and a method of providing, a wire wheel assembly for use with a tubeless tire. A wire wheel element comprises a wheel centre element, a spoke ring element, and a plurality of spoke elements extending between the wheel centre element and the spoke ring element. The spoke ring element is configured to allow a first rim element comprising a first rim tire flange and a second rim element comprising a second rim tire flange to be assembled with said wire wheel element into a wire wheel assembly in which a tire receiving region is defined between said first rim tire flange and said second rim tire flange. A first rim element and a second rim element configured to be assembled with said wire wheel element. A sandwich arrangement and a cantilever arrangement of a wire wheel assembly are disclosed. A split-rim wire wheel is disclosed.

10 Claims, 10 Drawing Sheets

WIRE WHEEL ASSEMBLY

CROSS-REFERENCE TO RELATED APPLICATION

The present application claims the priority under 35 U.S.C. 119 of United Kingdom Patent Application No. GB 1107343.4, filed May 3, 2011, which is hereby incorporated herein by reference in its entirety.

FIELD OF THE INVENTION

The present invention relates to wire wheel assembly apparatus, and a method of providing a wire wheel assembly, in particular to the provision of a split-rim wire wheel.

BACKGROUND TO THE INVENTION

Wire wheels for tires having an inner tube are known. Wheels for tubeless tires are also known. In some scenarios, it is desirable for a vehicle to use a wire wheel and a tubeless tire. In the example of a classic or historic racing car, it is desirable to use a wire wheel for aesthetic and vehicle specification consistency yet it is also desirable to use a tubeless tire for weight minimization.

It is found that known types of wire wheel are manufactured as bespoke items using specialist skills.

SUMMARY OF THE INVENTION

According to a first aspect there is provided wire wheel assembly apparatus for use with a tubeless tire, comprising: a wire wheel element comprising a wheel centre element, a spoke ring element, and a plurality of spoke elements extending between said wheel centre element and said spoke ring element; said spoke ring element configured to allow a first rim element comprising a first rim tire flange and a second rim element comprising a second rim tire flange to be assembled with said wire wheel element into a wire wheel assembly in which a tire receiving region is defined between said first rim tire flange and said second rim tire flange.

In an illustrated example, the wire wheel assembly apparatus further comprises a first rim element comprising a first rim tire flange; and a second rim element comprising a second rim tire flange; said first rim element and said second rim element configured to be assembled with said wire wheel element into a wire wheel assembly in which a tire receiving region is defined between said first rim tire flange and said second rim tire flange.

According to a second aspect there is provided a method of providing a wire wheel assembly for use with a tubeless tire, comprising the steps of: receiving a wire wheel element comprising a wheel centre element, a spoke ring element, and a plurality of spoke elements extending between said wheel centre element and said spoke ring element, receiving a first rim element comprising a first rim tire flange, receiving a second rim element comprising a second rim tire flange, and assembling said wire wheel element, said first rim element and said second rim element into a wire wheel assembly in which a tire receiving region is defined between said first rim tire flange and said second rim tire flange.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION

There will now be described by way of example a specific mode contemplated by the inventor. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

FIG. 1

Figure 1:
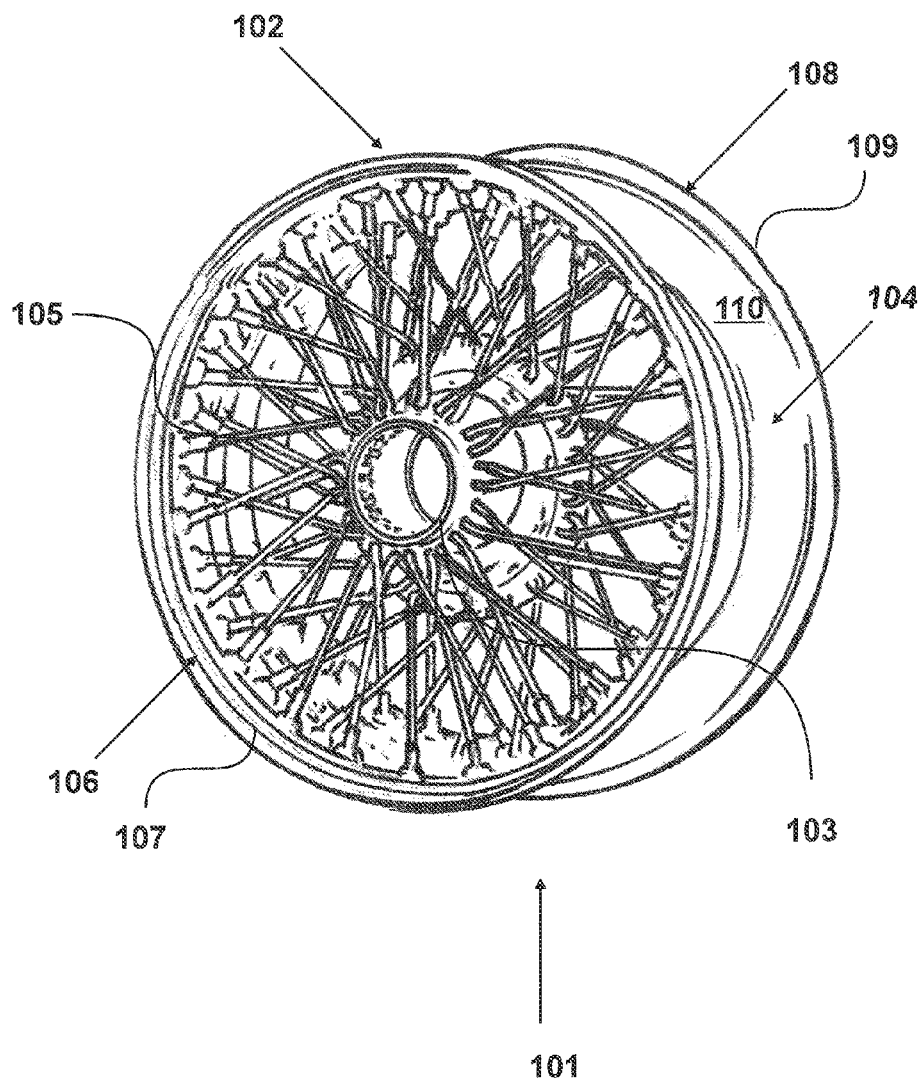
FIG. 1 shows a wire wheel assembly.

A schematic of a wire wheel assembly 101 is shown in FIG. 1. A wire wheel element 102 comprises a wheel centre element 103, a spoke ring element 104, and a plurality of spoke elements 105 extending between the wheel centre element 102 and the spoke ring element 103. A first rim element 106 comprises a first rim tire flange 107, and a second rim element 108 comprises a second rim tire flange 109. The spoke ring element 104 is configured to allow the first rim element 106 and the second rim element 108 to be assembled with the wire wheel element 102 into a wire wheel assembly in which a tire receiving region 110 is defined between the first rim tire flange 107 and the second rim tire flange 109. In this Fig., the wire wheel element 102, the first rim element 106 and the second rim element 108 are connected in wire wheel assembly 101.

In a preferred embodiment, the wire wheel assembly apparatus is configured to be releasably assembled into a wire wheel assembly. In a preferred embodiment, the wire wheel assembly apparatus is configured to be assembled into a wire wheel assembly wire wheel assembly for use with a tubeless tire.

FIG. 2

Figure 2:
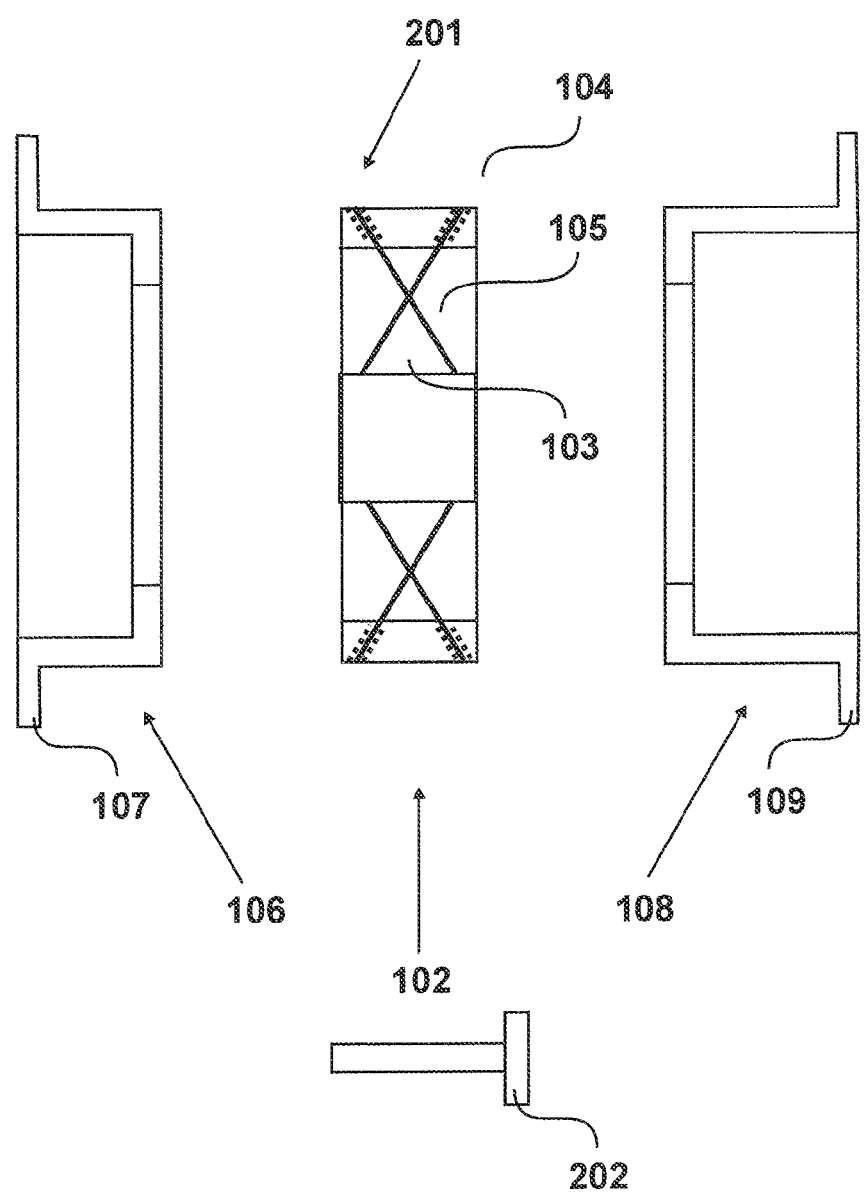
FIG. 2 illustrates wire wheel assembly apparatus elements.

Wire wheel assembly apparatus elements are illustrated in FIG. 2.

As previously described, wire wheel element 102 comprises a wheel centre element 103, a spoke ring element 104, and a plurality of spoke elements 105 extending between the wheel centre element 102 and the spoke ring element 103. The wire wheel element 102 may have any suitable dimensions. The wheel centre element 103 may have any suitable dimensions and shape. Similarly, the spoke rim element 104 may have any suitable dimensions and shape. The spoke elements 105 may be of any suitable type. Therefore each spoke may be a straight spoke or a butted spoke. The pattern of the plurality of spoke elements 105 may be any suitable pattern. The arrangement of the spoke elements may vary between applications. The arrangement of the spoke elements and the angle of the spoke elements may be selected to achieve a desired characteristic, for example strength.

According to this illustrated example, spoke ring element 104 of wire wheel element 102 defines a plurality of spoke apertures, indicated at 201, therethrough. As shown in this Fig., at least one spoke aperture 201 of wire wheel element 102 provides a passage through the spoke ring element 104.

As previously described, first rim element 106 comprises a first rim tire flange 107, and second rim element 108 comprises a second rim tire flange 109.

The first rim element 106 and the second rim element 108 may each have any suitable dimensions. The first rim element 106 and the second rim element 108 may each may each be fabricated from any suitable material or combination of materials.

It is to be understood that one of the first rim element 106 and the second rim element 108 will be selected as an inner rim element and the other of the first rim element 106 and the second rim element 108 will be selected as an outer rim element, and therefore the specific dimensions and features of the first rim element 106 may differ from those of the outer rim element 108.

The wire wheel element 102, first rim element 106 and second rim element 108 are assemblable into a wire wheel assembly in which a tire receiving region is defined between the first rim tire flange 107 and the second rim tire flange 109.

The spoke ring element 104, the first rim element 106 and the second rim element 108 may each define at least one connection aperture. The wire wheel assembly apparatus may then comprise at least one elongate rim element fastener 202 to facilitate assembly of the first rim element 106 and the second rim element 108 with the wire wheel element 102. Each elongate rim element fastener 202 may be of any suitable type. Each rim element may be connected to the wire wheel element at any suitable number of fixing locations.

It is to be appreciated that a particular wire wheel element may be assembled with any of a range of suitable inner rim elements and any of a range of suitable outer rim elements, thereby allowing different split-rim combinations to be achieved for that particular wire wheel element. In this way, the wire wheel assembly apparatus advantageously allows for the provision of a wire wheel assembly with selected dimensions, rim width and rim offset. In turn, a wire wheel assembly may be selected to accommodate a tire of particular diameter and width dimensions.

The modularity of the wire wheel element apparatus also allows for other characteristics of a wire wheel to be achieved. The wire wheel element 102, the first rim element 106 and the second rim element 107 may each be fabricated from any suitable material or combination of materials. The wheel centre element 103, the spoke ring element 104 and each spoke element 105 may each be fabricated from any suitable material or combination of materials. In an example, the fabrication of the wire wheel element comprises at least one metal material. The metal material may be steel. In another example, the fabrication of the wire wheel element comprises carbon fiber. In an example, the fabrication of each rim element comprises at least one metal material. The metal material may be aluminium. In another example, the fabrication of the each rim element comprises carbon fiber. The material or materials used in the fabrication of the wire wheel element, the first rim element and the second rim element may vary between applications. Material selection may vary to achieve differing specifications, for example to achieve a desired characteristic such as strength, weight, aesthetic appearance or cost.

FIG. 3

Figure 3:
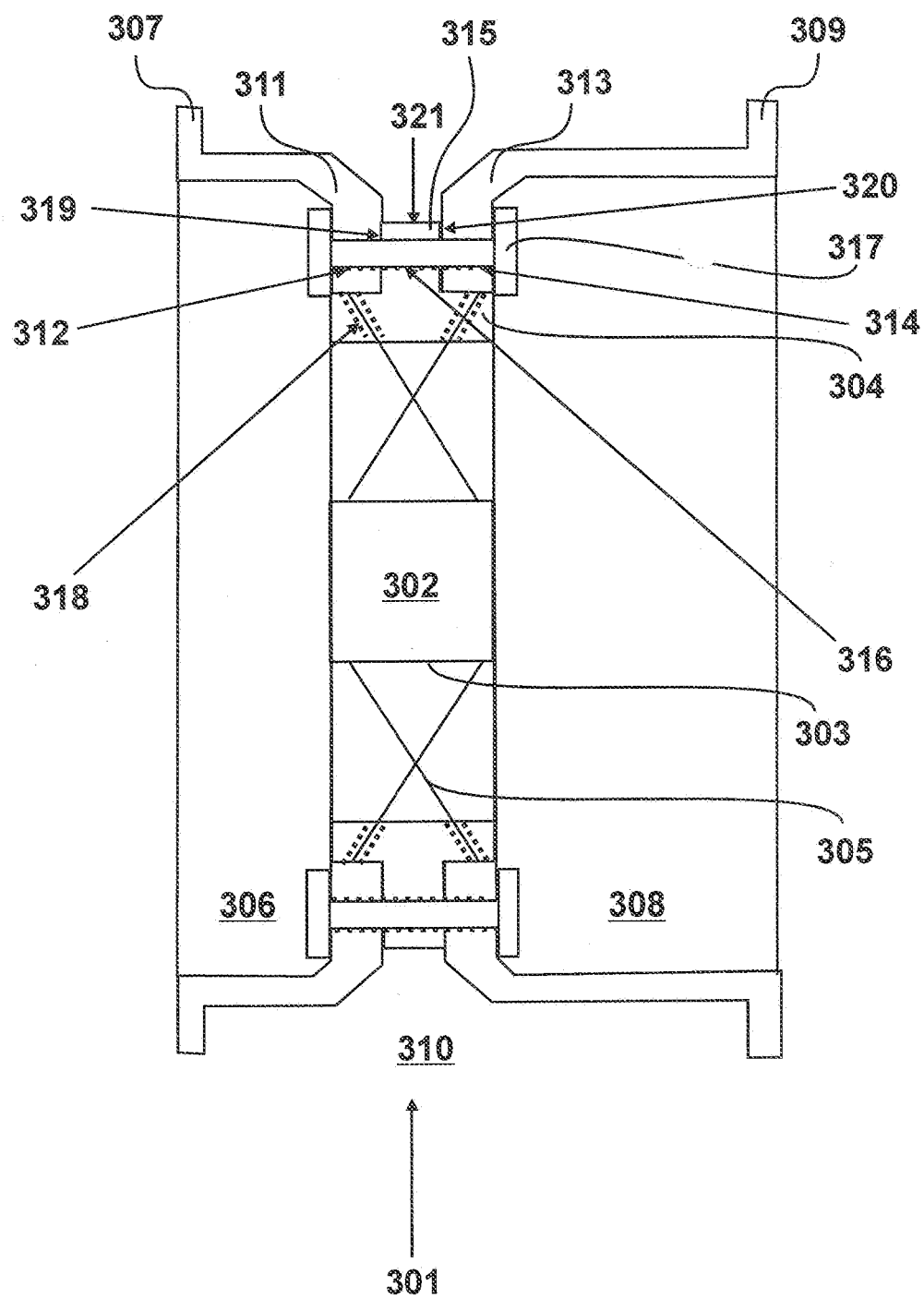
FIG. 3 illustrates a first wire wheel assembly arrangement.

FIG. 3 illustrates a first wire wheel assembly arrangement 301.

A wire wheel element 302 comprises a wheel centre element 303, a spoke ring element 304, and a plurality of spoke elements, such as spoke element 305, extending between the wheel centre element 303 and the spoke ring element 304. A first rim element 306 comprises a first rim tire flange 307, and a second rim element 308 comprises a second rim tire flange 309. A tire receiving region 310 is defined between the first rim tire flange 307 and the second rim tire flange 309.

The first rim element 306 comprises a first rim connection flange 311 defining a first rim connection aperture 312. Similarly, the second rim element 308 comprises a second rim connection flange 313 defining a second rim connection aperture 314. The spoke ring element 304 comprises a connection portion 315 defining a spoke ring element connection aperture 316. An elongate rim element fastener 317 is received within the first rim connection aperture 312, the second rim connection aperture 314 and the spoke ring element connection aperture 316.

In the first wire wheel assembly arrangement 301 shown in this Fig., the first rim element 306 and the second rim element 307 are disposed one to each side of the connection portion 315 of the spoke ring element 304 of wire wheel element 302, and the elongate rim element fastener 317 is inserted through each of the first rim connection aperture 312, the second rim connection aperture 314 and the spoke ring element connection aperture 316.

Since the first rim element 306 and the second rim element 307 are disposed one to each side of the connection portion 315 of the spoke ring element 304, the wire wheel assembly arrangement of this Fig. is herein termed a 'sandwich arrangement'.

According to this illustrated example, spoke ring element 304 of wire wheel element 302 defines a plurality of spoke apertures, indicated at 318 therethrough.

The connection portion 315 of the spoke ring element 304 presents a pair of connection side surfaces 319, 320 and a top surface 321.

According to the shown arrangement, the top surface 321 of the connection portion 315 of the spoke ring element 304 is open to the tire receiving region 310. In this first illustrated sandwich arrangement, none of the spoke apertures 318 are open to the top surface 321 of the connection portion 315 of the spoke ring element 304, and hence none of the spoke apertures 318 are open to the tire receiving region 310.

FIG. 4

Figure 4:
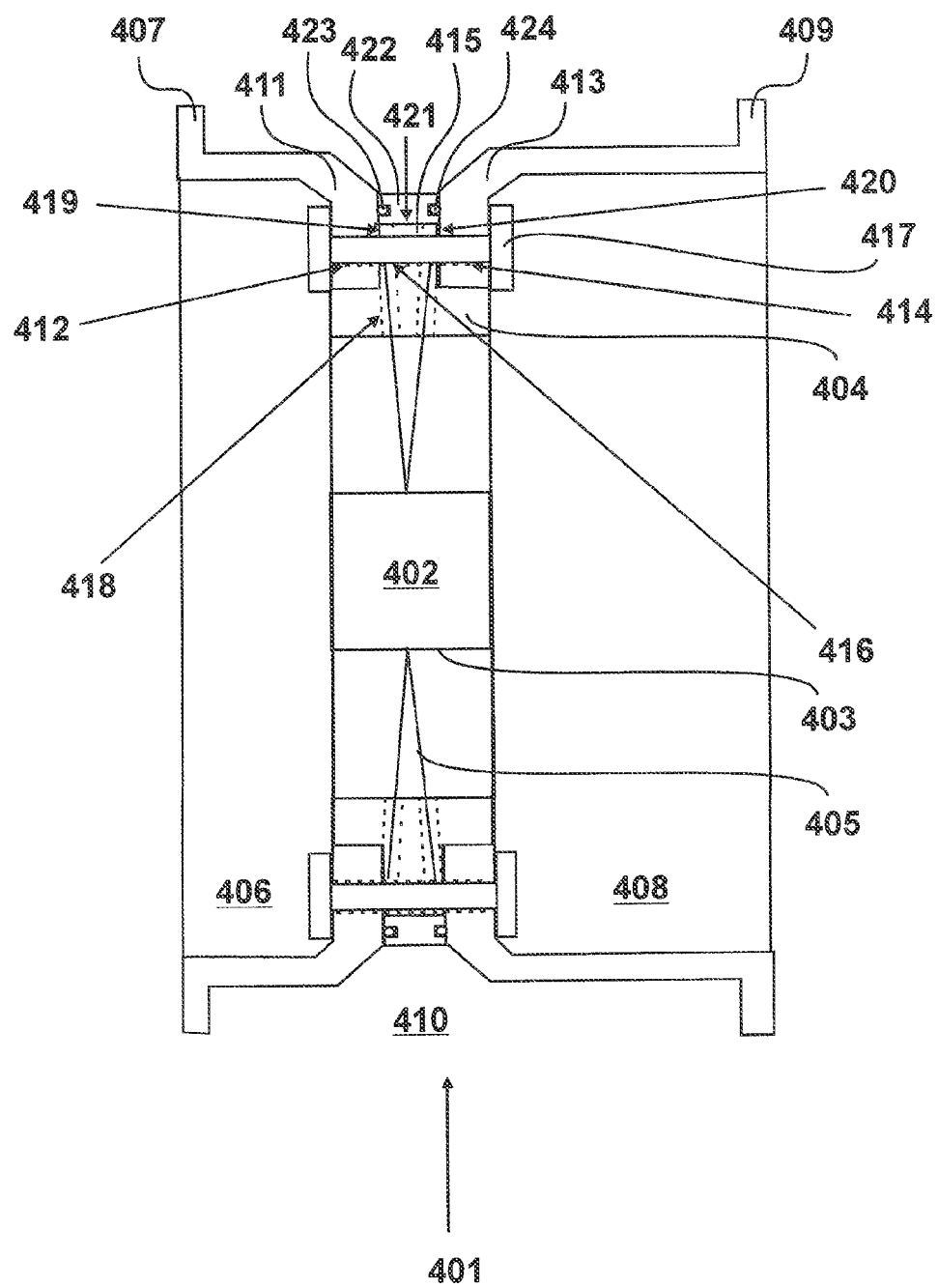
FIG. 4 illustrates a second wire wheel assembly arrangement.

FIG. 4 illustrates a second wire wheel assembly arrangement 401.

A wire wheel element 402 comprises a wheel centre element 403, a spoke ring element 404, and a plurality of spoke elements 405 extending between the wheel centre element 403 and the spoke ring element 404. A first rim element 406 comprises a first rim tire flange 407, and a second rim element 408 comprises a second rim tire flange 409. A tire receiving region 410 is defined between the first rim tire flange 407 and the second rim tire flange 409.

The first rim element 406 comprises a first rim connection flange 411 defining a first rim connection aperture 412. Similarly, the second rim element 408 comprises a second rim connection flange 413 defining a second rim connection aperture 414. The spoke ring element 404 comprises a connection portion 415 defining a spoke ring element connection aperture 416. An elongate rim element fastener 417 is received within the first rim connection aperture 412, the second rim connection aperture 414 and the spoke ring element connection aperture 416.

In the first wire wheel assembly arrangement 401 shown in this Fig., the first rim element 406 and the second rim element 407 are disposed one to each side of the connection portion 415 of the spoke ring element 404 of wire wheel element 402, and the elongate rim element fastener 417 is inserted through each of the first rim connection aperture 412, the second rim connection aperture 414 and the spoke ring element connection aperture 416.

According to this illustrated example, spoke ring element 404 of wire wheel element 402 defines a plurality of spoke apertures, such as spoke aperture indicated at 418, therethrough.

The connection portion 415 of the spoke ring element 404 presents a pair of connection side surfaces 419, 420 and a top surface 421.

According to the shown arrangement, the top surface 421 of the connection portion 415 of the spoke ring element 404 is open to the tire receiving region 410. In this second illustrated sandwich arrangement, at least one of the spoke apertures 318 is open to the top surface 421 of the connection portion 415 of the spoke ring element 404, and hence at least one of the spoke apertures 418 is open to the tire receiving region 410.

Thus, at least one spoke aperture 418 provides a passage for air through the spoke ring element 404. Air may therefore pass from the tire receiving region 410 through the spoke ring element 404. In order for the wire wheel assembly to be used with a tubeless tire, a seal is required between the top surface 421 of the connection portion 415 of the spoke ring element 404 to prevent air from exiting a tubeless tire received within the tire receiving region 410 through the spoke aperture 418.

The wheel assembly apparatus of this illustrated example therefore further comprises a sealing arrangement. The sealing arrangement is configurable to provide a mechanical seal along the top surface 421 of the connection portion 415 of the spoke ring element 404. The sealing arrangement provides a seal between the spoke aperture 418 and the tire receiving region 410, to prevent leakage of air through the spoke ring element 404.

In the shown arrangement, the sealing arrangement comprises a sealing ring 422, a first 'O' ring 423 and a second 'O' ring 424 so arranged upon the top surface 421 of the connection portion 415 of the spoke ring element 404 as to provide the tire receiving region 410 with a mechanical seal. In this specific example, the sealing ring 422 has a substantially 'I-shaped' cross-section that presents a first 'O' ring receiving region within which first 'O' ring 423 is located and a second 'O' ring receiving region within which second 'O' ring 424 is located.

The mechanical seal provided by the shown arrangement of sealing ring 422, and first and second 'O' rings 423, 424 functions to prevent air from entering into the tire air pressure area of tire receiving region 410 through spoke ring apertures open that tire air pressure area of tire receiving region 410. This advantageously allows a tubeless tire to be fitted to the wheel assembly. It is to be appreciated that the sealing ring 422 and the first and second 'O' rings 423, 424 may each have any suitable dimensions and may each be fabricated from any suitable material or combination of materials.

It is to be understood that any suitable type of sealing arrangement may be used that will provide a reliable, mechanical seal and that will accommodate any spoke nipples protruding into the tire air pressure area of the tire receiving region of a wire wheel assembly may be used to enable that wire wheel assembly to have a tubeless tire fitted thereto. An alternative type of sealing arrangement comprises a sealing ring only; in an example, the sealing ring has a substantially rectangular cross-section. The sealing ring may then be a silicone body or a rectangular metal ring using silicone or other sealant at the sealing faces for example. A further alternative type of sealing arrangement comprises only one O' ring for example.

FIG. 5

Figure 5:
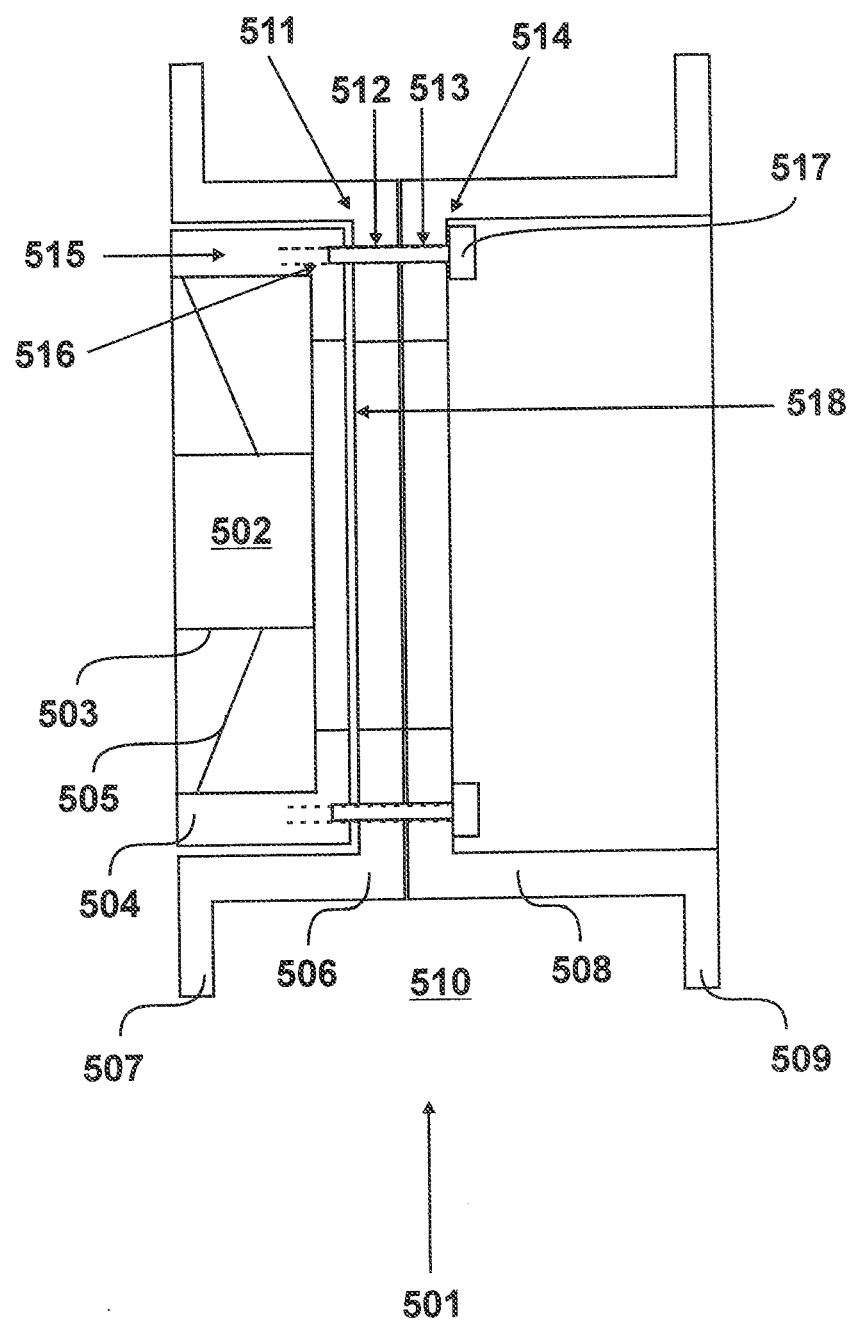
FIG. 5 illustrates a third wire wheel assembly arrangement.

FIG. 5 illustrates a third wire wheel assembly arrangement 501.

A wire wheel element 502 comprises a wheel centre element 503, a spoke ring element 504, and a plurality of spoke elements, such as spoke element 505, extending between the wheel centre element 503 and the spoke ring element 504. A first rim element 506 comprises a first rim tire flange 507, and a second rim element 508 comprises a second rim tire flange 509. A tire receiving region 510 is defined between the first rim tire flange 507 and the second rim tire flange 509.

The first rim element 506 comprises a first rim connection flange 511 defining a first rim connection aperture 512. Similarly, the second rim element 508 comprises a second rim connection flange 513 defining a second rim connection aperture 514. The spoke ring element 504 presents a connection portion 515 defining a spoke ring element connection aperture 516. An elongate rim element fastener 517 is received within the first rim connection aperture 512, the second rim connection aperture 514 and the spoke ring element connection aperture 516.

The connection portion 515 of the spoke ring element 504 presents a single connection side surface 518, and the spoke ring element connection aperture 516 extends into the connection portion 515 from the connection side surface 518.

In the second wire wheel assembly arrangement 501 shown in this Fig., the first rim element 506 and the second rim element 508 are both disposed to the same side of the connection portion 515 of the spoke ring element 504, with the first rim element 506 located between the connection side surface 518 and the second rim element 508, and the elongate rim element fastener 517 inserted through each of the first rim connection aperture 512 and the second rim connection aperture 514 and into the spoke ring element connection aperture 516.

Since the first rim element 506 and the second rim element 508 are both disposed to the same side of the connection portion 515 of the spoke ring element 504, the wire wheel assembly arrangement of this Fig. is herein referred to as a 'cantilever arrangement'.

FIG. 6

Figure 6:
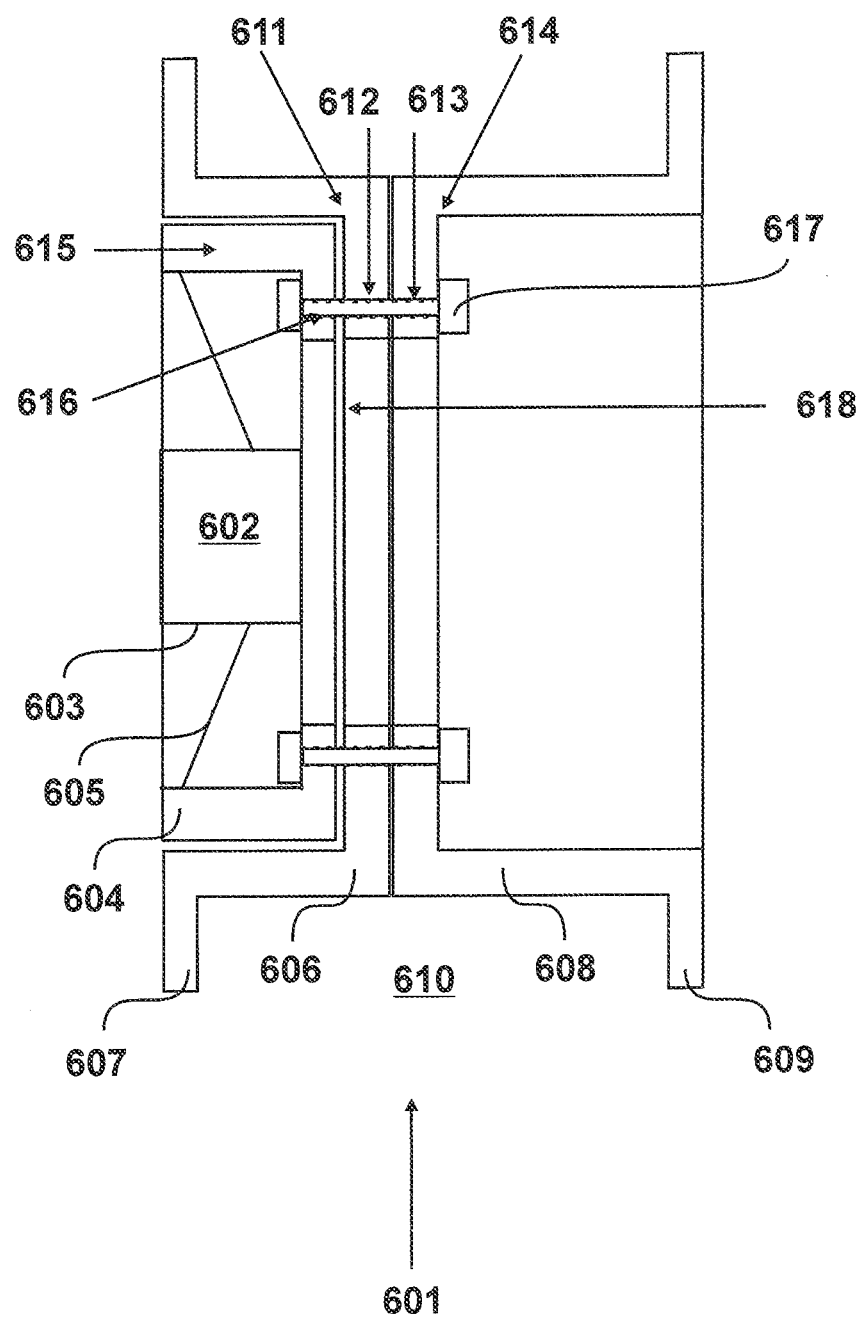
FIG. 6 illustrates a fourth wire wheel assembly arrangement.

FIG. 6 illustrates a fourth wire wheel assembly arrangement 601.

A wire wheel element 602 comprises a wheel centre element 603, a spoke ring element 604, and a plurality of spoke elements, such as spoke element 605, extending between the wheel centre element 603 and the spoke ring element 604. A first rim element 606 comprises a first rim tire flange 607, and a second rim element 608 comprises a second rim tire flange 609. A tire receiving region 610 is defined between the first rim tire flange 607 and the second rim tire flange 609.

The first rim element 606 comprises a first rim connection flange 611 defining a first rim connection aperture 612. Similarly, the second rim element 608 comprises a second rim connection flange 613 defining a second rim connection aperture 614. The spoke ring element 604 presents a connection portion 615 defining a spoke ring element connection aperture 616. An elongate rim element fastener 617 is received within the first rim connection aperture 612, the second rim connection aperture 614 and the spoke ring element connection aperture 616.

The connection portion 615 of the spoke ring element 604 presents a single connection side surface 618, and the spoke ring element connection aperture 616 extends into the connection portion 615 from the connection side surface 618.

According to this illustrated fourth wire wheel assembly cantilever arrangement, the spoke ring element connection aperture 616 extends fully through the spoke ring element 604. The elongate rim element fastener is then received through the first rim connection aperture 612, the second rim connection aperture 614 and the spoke ring element connection aperture 616. The elongate rim element fastener may then be a bolt secured with a nut.

FIG. 7

Figure 7:
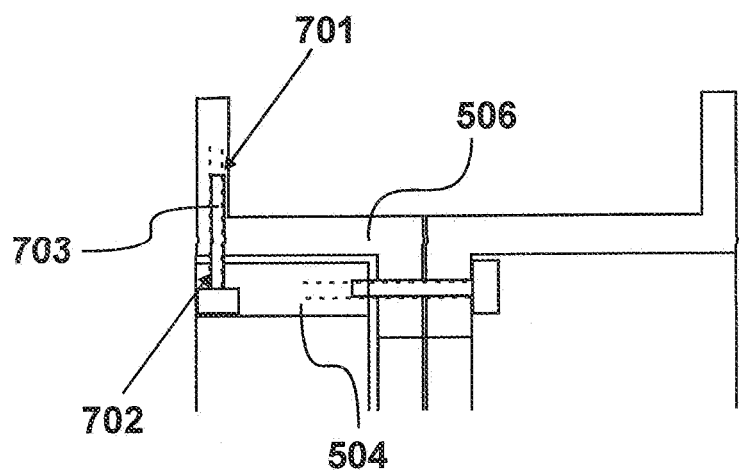
FIG. 7 shows an optional additional feature of the third wire wheel assembly arrangement of FIG. 5 to further secure the first rim element to the wire wheel element.

FIG. 7 shows an optional additional feature of the third wire wheel assembly arrangement of FIG. 5, to further secure the first rim element to the wire wheel element.

As shown, the first rim element 506 defines a second first rim connection aperture 701, the spoke ring element 504 defines a second spoke ring element connection aperture 702, and the wire wheel assembly apparatus further comprises a second elongate rim element fastener 703 configured to be received within the second first rim connection aperture 701 and the second spoke ring element connection aperture 702. This attachment arrangement serves to strengthen the connection between the first rim element 506 and the spoke ring element 504.

FIG. 8

Figure 8:
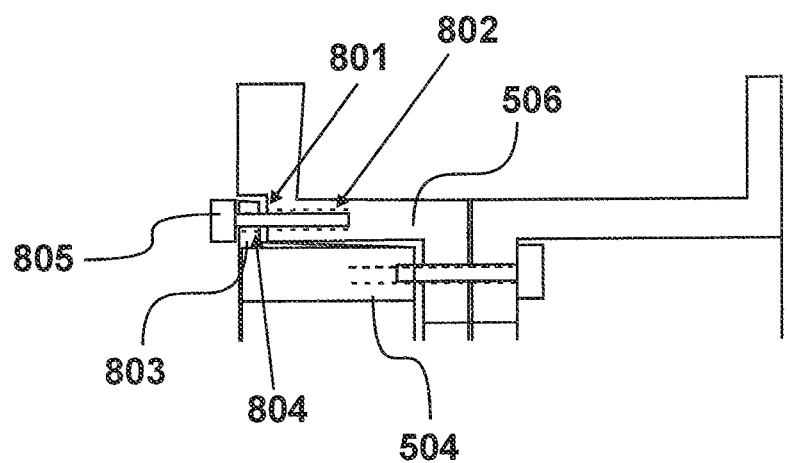
FIG. 8 shows an alternative optional additional feature of the third wire wheel assembly arrangement of FIG. 5, to further secure the first rim element to the wire wheel element.

FIG. 8 shows an alternative optional additional feature of the second wire wheel assembly arrangement of FIG. 5, to further secure the first rim element to the wire wheel element.

As shown, the first rim element 506 comprises a recessed mounting flange portion 801 that defines a second first rim connection aperture 802 extending therefrom. The spoke ring element 504 defines a mounting flange portion 803 that defines a second spoke ring element connection aperture 804 extending therethrough. The wire wheel assembly apparatus further comprises a second elongate rim element fastener 805 configured to extend through the second spoke ring element connection aperture 804 and configured to be received within the second first rim connection aperture 802. This attachment arrangement serves to strengthen the connection between the first rim element 506 and the spoke ring element 504.

It is to be generally appreciated that any fastener used between a rim element and the wire wheel element may be configured to be flush with or countersunk relative to any external surface, as appropriate, for a construction and/or aesthetic reason.

FIG. 9

Figure 9:
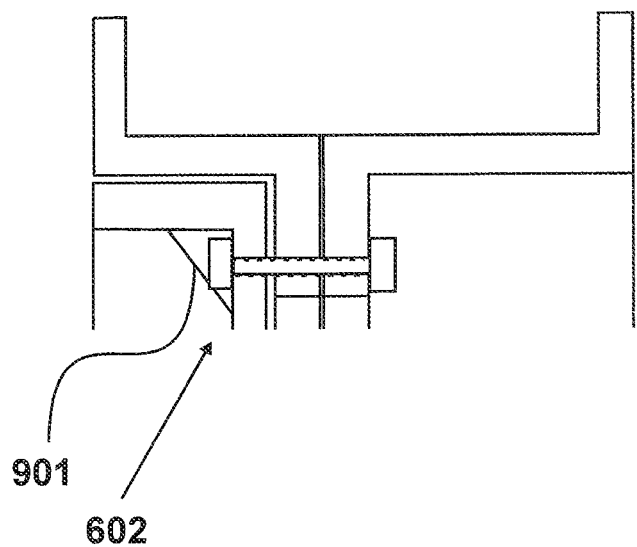
FIG. 9 shows an optional additional feature of the fourth wire wheel assembly arrangement of FIG. 6, to strengthen the wire wheel element.

FIG. 9 shows an optional additional feature of the fourth wire wheel assembly arrangement of FIG. 6, to strengthen the wire wheel element. As shown in this Fig., the wire wheel element 602 comprises a strengthening web 901. This strengthening web is one of a plurality of strengthening webs, in this example a series of strengthening webs.

FIG. 10

Figure 10:
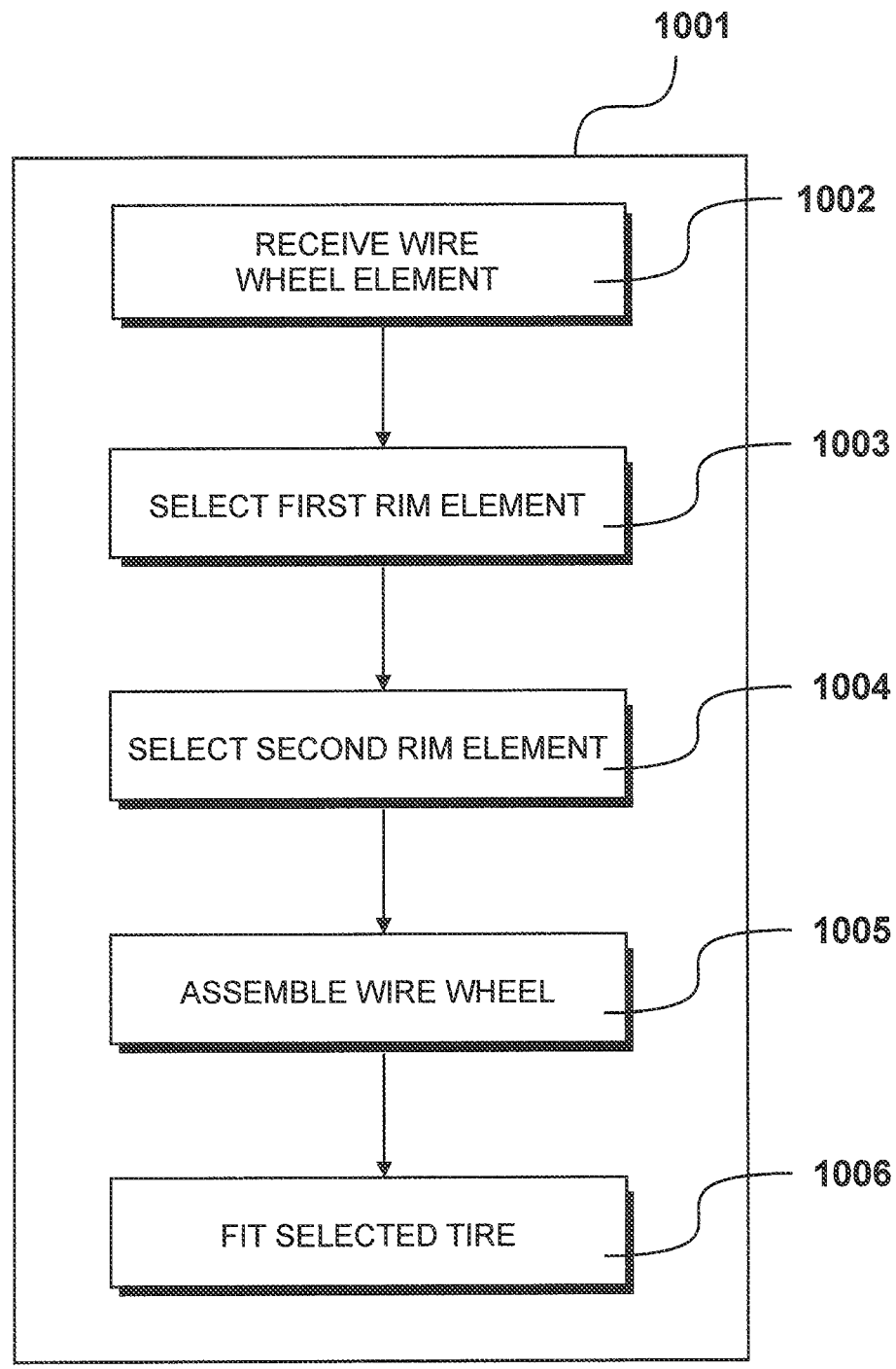
FIG. 10 shows steps in a method of providing a wire wheel assembly.

FIG. 10 illustrates steps in a method 1001 of providing a wire wheel assembly. A wire wheel element comprising a wheel centre element, a spoke ring element, and a plurality of spoke elements extending between said wheel centre element and said spoke ring element is received at step 1002. At step 1003 a first rim element comprising a first rim tire flange is received, and a second rim element comprising a second rim tire flange is received at step 1004. At step 1005, the wire wheel element, the first rim element and the second rim element are assembled into a wire wheel assembly in which a tire receiving region is defined between said first rim tire flange and said second rim tire flange. When a tubeless tire is to be used with the wire wheel assembly, any mechanical seal required to prevent ingress of air into the tire receiving region is provided at this stage. Any aesthetic components may also be added to the assembly. The selected tire may then be fitted to the assembled wire wheel at step 1006. The resultant wire wheel may then be fitted to a vehicle as appropriate, for example a car, a motorcycle or other type of vehicle.

Wire wheel assembly apparatus is described herein for a split-rim wire wheel assembly. A method of providing a split-rim wire wheel is also described herein. A split-rim wire wheel for use with a tubeless tire is herein disclosed.

The modular approach to the provision of a wire wheel assembly as described herein has the advantage that a wire wheel element may be manufactured and then supplied to an outlet that also stocks split-rim elements. A store operative may then conveniently select a wire wheel element, an inner rim element and an outer rim element and complete the assembly without specialist wire wheel construction skills needed to produce wire wheels using known techniques within a reasonable lead time. This is advantageous both for retailers and customers.

The invention claimed is:

1. Wire wheel assembly apparatus for use with a tubeless tire, comprising:
   a wire wheel element comprising a wheel centre element, a spoke ring element, and a plurality of spoke elements extending between said wheel centre element and said spoke ring element;
   a first rim element comprising a first rim tire flange;
   a second rim element comprising a second rim tire flange;
   said first rim element and said second rim element configured to be assembled with said wire wheel element into a wire wheel assembly in which a tire receiving region is defined between said first rim tire flange and said second rim tire flange wherein:
   said first rim element comprises a first rim connection flange defining a first rim connection aperture;
   said second rim element comprises a second rim connection flange defining a second rim connection aperture;
   said spoke ring element comprises a connection portion defining a spoke ring element connection aperture;
   said wire wheel assembly apparatus comprises an elongate rim element fastener configured to be received within said first rim connection aperture, said second rim connection aperture and said spoke ring element connection aperture; and,
   said connection portion of said spoke ring element presents a top surface and none of the spoke apertures are open to the top surface.

2. Wire wheel assembly apparatus as claimed in claim 1, wherein said first rim element, said second rim element and wire wheel element are configured to be releasably assembled into said wire wheel assembly.

3. Wire wheel assembly apparatus as claimed in claim 1, wherein:
   said connection portion of said spoke ring element presents a pair of connection side surfaces, and said spoke ring element connection aperture extends through said connection portion, and
   said wire wheel element, said first rim element and said second rim element are configured to be assembled into a first wire wheel assembly arrangement in which:
   said first rim element and said second element are disposed one to each side of said connection portion, and said elongate rim element fastener is inserted through each of said first rim connection aperture, said second rim connection aperture and said spoke ring element connection aperture.

4. Wire wheel assembly apparatus as claimed in claim 3, further comprising a sealing arrangement configurable to provide a mechanical seal along the top surface of said connection portion of said spoke ring element.

5. Wire wheel assembly apparatus as claimed in claim 4, wherein said sealing arrangement comprises a sealing ring and a pair of 'O' rings configured to be so arranged upon said top surface of said connection portion as to provide said tire receiving region with a mechanical seal.

6. Wire wheel assembly apparatus as claimed in claim 1, wherein said connection portion of said spoke ring element presents a single connection side surface, and said spoke ring element connection aperture extends into said connection portion from said connection side surface, and
   said wire wheel element, said first rim element and said second rim element are configured to be assembled into a second wire wheel assembly arrangement in which:
   said first rim element and said second rim element are both disposed to the same side of said connection portion, with said first rim element located between said connection side surface and said second rim element, and said elongate rim element fastener is inserted through each of said first rim connection aperture and said second rim connection aperture and into spoke ring element connection aperture.

7. Wire wheel assembly apparatus as claimed in claim 6, wherein
   said first rim element defines a second first rim connection aperture,
   said spoke ring element defines a second spoke ring element connection aperture, and
   said wire wheel assembly apparatus further comprises a second elongate rim element fastener configured to be received within second first rim connection aperture and said second spoke ring element connection aperture.

8. Wire wheel assembly apparatus as claimed in claim 6, wherein said wire wheel element comprises at least one strengthening web.

9. Wire wheel assembly apparatus as claimed in claim 1, wherein said wire wheel assembly is fabricated from at least one metal material.

10. Wire wheel assembly apparatus as claimed in claim 1, wherein said plurality of spoke elements is a plurality of butted spoke elements.

\* \* \* \* \*